UNITED STATES PATENT OFFICE.

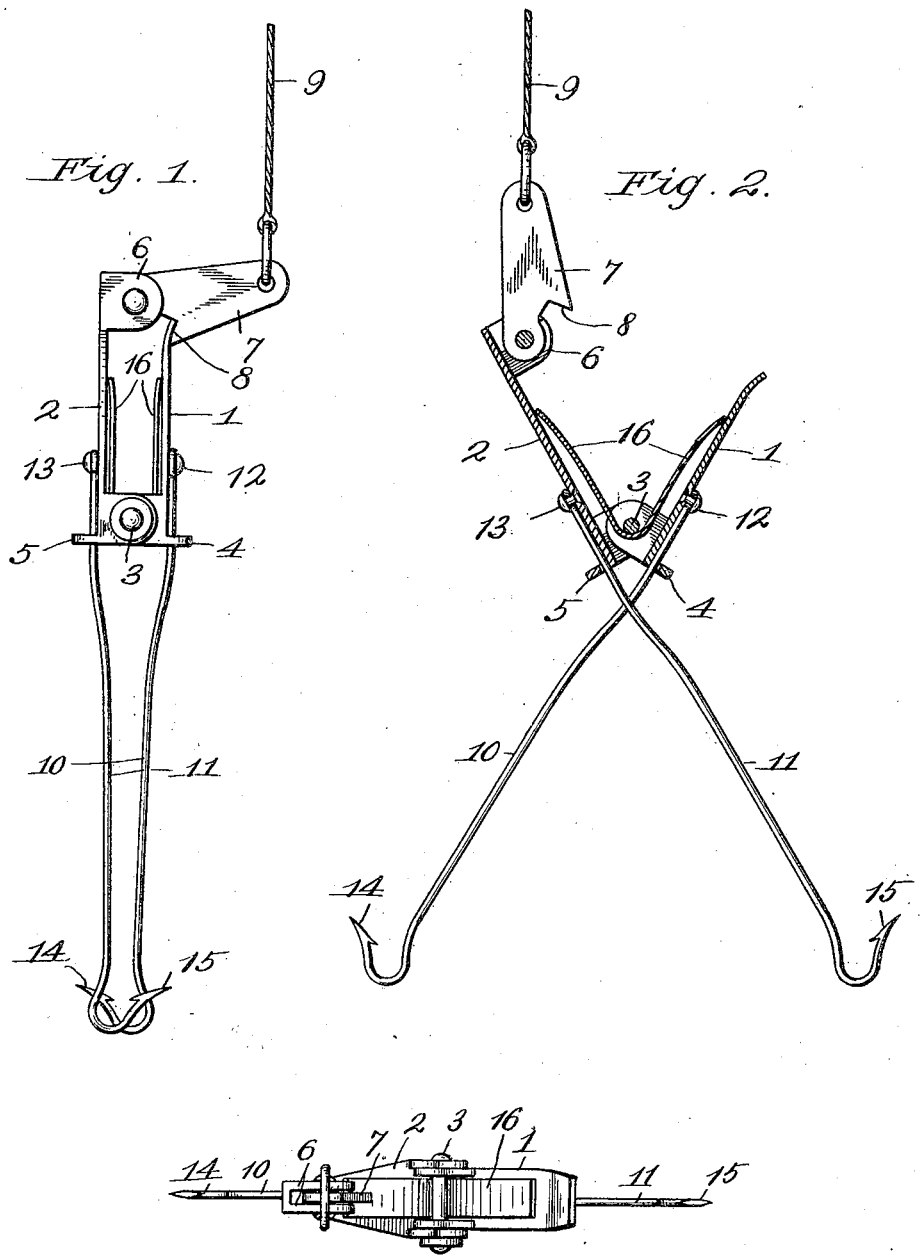

WILLIAM GABRIELSON, OF KANSAS CITY, MISSOURI.

HOOK FOR CATCHING FISH AND ANIMALS.

No. 922,879. Specification of Letters Patent. Patented May 25, 1909.

Application filed September 21, 1908. Serial No. 454,104.

*To all whom it may concern:*

Be it known that I, WILLIAM GABRIELSON, a citizen of the United States, residing at Kansas City, in the county of Jackson and State of Missouri, have invented certain new and useful Improvements in Hooks for Catching Fish and Animals, of which the following is a specification.

My invention relates to improvements in fish and animal hooks, and my object is to provide a simple device of this character whereby a fish or animal will be reliably held from escape after springing the hook.

With the above and other objects in view the invention may be said to consist in the construction and novel combination and arrangement of parts hereinafter described, illustrated in the accompanying drawing, and pointed out in the claims appended hereto, it being understood that various changes in form, proportions, and minor details of construction may be resorted to without departing from the principle or sacrificing any of the advantages of the invention.

Referring now to the accompanying drawing, Figure 1 represents a side elevation of the device set for operation. Fig. 2 is a side elevation partly in section of the device in a sprung position. Fig. 3 is a plan view of the device.

In carrying out the invention I employ two arms 1 and 2, pivotally connected at their lower ends by a pin 3, and provided with eyes 4 and 5, respectively. The upper end of arm 2 has a pair of lugs 6, between which a trigger 7 is pivotally secured, said trigger being provided with a shoulder 8 adapted to engage the upper free end of arm 1, as shown in Fig. 1.

9 designates a cable secured to the free end of the trigger for tripping the same.

10 and 11 designate a pair of hook-members extending through eyes 4 and 5 and secured to arms 1 and 2 by rivets 12 and 13, respectively. Hook-members 10 and 11 are provided with barbed lower terminals 14 and 15, respectively, for reliably holding a fish or animal after being caught thereby.

16 designates a V-shaped resilient member extending beneath pin 3 and pressing outwardly against the upper portions of arms 1 and 2.

In practice, the barbed terminals 14 15, are baited and the free ends of arms 1 and 2 are pressed toward each other to compress the resilient member 16, bring the barbed terminals 14 15 together, and engage the free end of arm 1 with trigger 7, in order to set the device. Cable 9 is then either held in the hand or anchored to some stationary object, so that when a fish or animal takes the bait and pulls thereon, the trigger will be tripped and allow the resilient member 16 to spread the free ends of arms 1 and 2 apart to throw the barbed terminals of the hook-members in opposite directions, so they will engage the roof and lower portions of the mouth of a fish or animal, and reliably hold the same until released by hand.

Having thus described my invention, what I claim is:—

1. A device of the character described consisting of two arms pivotally-connected, hook-members secured thereto, a trigger pivotally secured to the free end of one arm and adapted to engage the free end of the other arm for holding the hooks together, a cable attached to said trigger for disengaging it from said other arm, and a resilient member for throwing the free ends of the arms apart when the trigger is thrown to an inoperative position.

2. A device of the character described consisting of two arms pivotally-connected, said arms being provided at their pivoted ends with eyes, and one of said arms being provided at its free end with a pair of lugs, a trigger pivotally secured to said lugs and adapted to hold the arms adjacent to each other, a pair of hook-members extending through the eyes and riveted at their upper terminals to the arms, and a resilient member for spreading the arms apart when one of the latter is released from the trigger.

In testimony whereof I affix my signature, in the presence of two witnesses.

WILLIAM GABRIELSON.

Witnesses:
    F. G. FISCHER,
    M. COX.